(12) United States Patent
Watanabe (10) Patent No.: US 10,855,885 B2
(45) Date of Patent: Dec. 1, 2020

(54) IMAGE PROCESSING APPARATUS, METHOD THEREFOR, AND STORAGE MEDIUM

(71) Applicant: CANON KABUSHIKI KAISHA, Tokyo (JP)

(72) Inventor: Kyouhei Watanabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 16/207,841

(22) Filed: Dec. 3, 2018

(65) Prior Publication Data
US 2019/0182408 A1 Jun. 13, 2019

(30) Foreign Application Priority Data
Dec. 13, 2017 (JP) .................................. 2017-238674

(51) Int. Cl.
| | | |
|---|---|---|
| *H04N 1/60* | (2006.01) | |
| *G06K 9/62* | (2006.01) | |
| *G06K 9/00* | (2006.01) | |
| *H04N 5/33* | (2006.01) | |
| *G06T 5/00* | (2006.01) | |
| *H04N 5/232* | (2006.01) | |
| *H04N 1/62* | (2006.01) | |
| *H04N 9/04* | (2006.01) | |

(52) U.S. Cl.
CPC ....... *H04N 1/6005* (2013.01); *G06K 9/00604* (2013.01); *G06K 9/6202* (2013.01); *G06T 5/002* (2013.01); *G06T 5/009* (2013.01); *H04N 1/6027* (2013.01); *H04N 1/628* (2013.01); *H04N 5/232* (2013.01); *H04N 5/332* (2013.01); *H04N 9/0451* (2018.08); *H04N 9/04553* (2018.08)

(58) Field of Classification Search
CPC .... H04N 1/6005; H04N 1/6027; H04N 1/628; H04N 9/04553; H04N 9/0451; H04N 5/332; H04N 5/232; H04N 5/2354; H04N 5/217; H04N 5/23219; G06K 9/6202; G06K 9/00604; G06K 9/4652; G06K 9/00255; G06K 9/2018; G06K 9/00248; G06T 5/009; G06T 5/002; G06T 2207/10024; G06T 2207/10048; G06T 2207/30201; G06T 5/008
USPC ......................................................... 382/274
See application file for complete search history.

(56) References Cited

U.S. PATENT DOCUMENTS

| | | | |
|---|---|---|---|
| 2008/0088826 A1* | 4/2008 | Ohyama ................... | G01J 3/51 356/51 |
| 2016/0206216 A1* | 7/2016 | Kirenko ............. | A61B 5/14551 |

(Continued)

FOREIGN PATENT DOCUMENTS

JP         2017-097645 A      6/2017

*Primary Examiner* — Juan A Torres
(74) *Attorney, Agent, or Firm* — Canon U.S.A., Inc. IP Division (57) ABSTRACT

An image processing apparatus includes a skin area detection unit configured to detect a skin area of an object person, a difference area detection unit configured to detect a difference area between the visible light image and the infrared light image, a correction target area detection unit configured to detect a correction target area of the object person based on the skin area detected by the skin area detection unit and the difference area detected by the difference area detection unit, and a correction unit configured to correct the correction target area in the visible light image.

14 Claims, 7 Drawing Sheets

(56) References Cited

U.S. PATENT DOCUMENTS

2018/0330160 A1* 11/2018 Yamamoto ......... G06K 9/00255
2018/0365484 A1* 12/2018 Yu ..................... G06K 9/00248

* cited by examiner

FIG.7

IMAGE PROCESSING APPARATUS, METHOD THEREFOR, AND STORAGE MEDIUM

CROSS REFERENCE TO RELATED APPLICATIONS

The present application claims the benefit of priority from Japanese Patent Application No. 2017-238674 filed Dec. 13, 2017, which is hereby incorporated by reference herein in its entirety.

BACKGROUND

Field of the Disclosure

The present disclosure generally relates to image processing and, more particularly, to an image processing apparatus, a method therefor, and a storage medium.

Description of the Related Art

Conventionally, a digital camera or a smartphone has been provided with a function of executing image processing on a captured skin area of an object person to apply an effect of making the skin look more beautiful. For example, in the technique discussed in Japanese Patent Application Laid-Open No. 2017-97645, a visible light image and an infrared light image are captured, a face image is recognized from the infrared light image, and a beautiful skin image in which a blemish is less noticeable is generated.

However, with the above-described technique, although a beautiful skin image can be acquired, there is a risk in which a color or a quality of the skin is degraded. In the above-described technique, when the beautiful skin image is to be acquired, a new luminance component is generated by combining a luminance component of the visible light image with the infrared light image, and the new luminance component is combined with a color difference component of the visible light image. Therefore, a skin color or quality tends to become more different from the actual skin color or quality if the ratio of the infrared light image is greater. Then, in the conventional technique, because correction is executed with respect to the entire skin color area in the face range of the object person, a correction area is large in size, and difference from the actual skin color or quality is likely to be noticed.

SUMMARY

According to one or more aspects of the present disclosure, an image processing apparatus which executes image processing by using a visible light image and an infrared light image includes at least one processor configured to function as: a skin area detection unit configured to detect a skin area of an object person, a difference area detection unit configured to detect a difference area between the visible light image and the infrared light image, a correction target area detection unit configured to detect a correction target area of the object person based on the skin area detected by the skin area detection unit and the difference area detected by the difference area detection unit, and a correction unit configured to correct the correction target area in the visible light image.

Further features of the present disclosure will become apparent from the following description of exemplary embodiments with reference to the attached drawings.

DESCRIPTION OF THE EMBODIMENTS

Hereinafter, various exemplary embodiments, features, and aspects of the present disclosure will be described with reference to the appended drawings. In the present exemplary embodiment, a digital camera will be described as an example which serves as an image capturing apparatus and functions as an image processing apparatus to which the present disclosure is applied.

Figure 1:
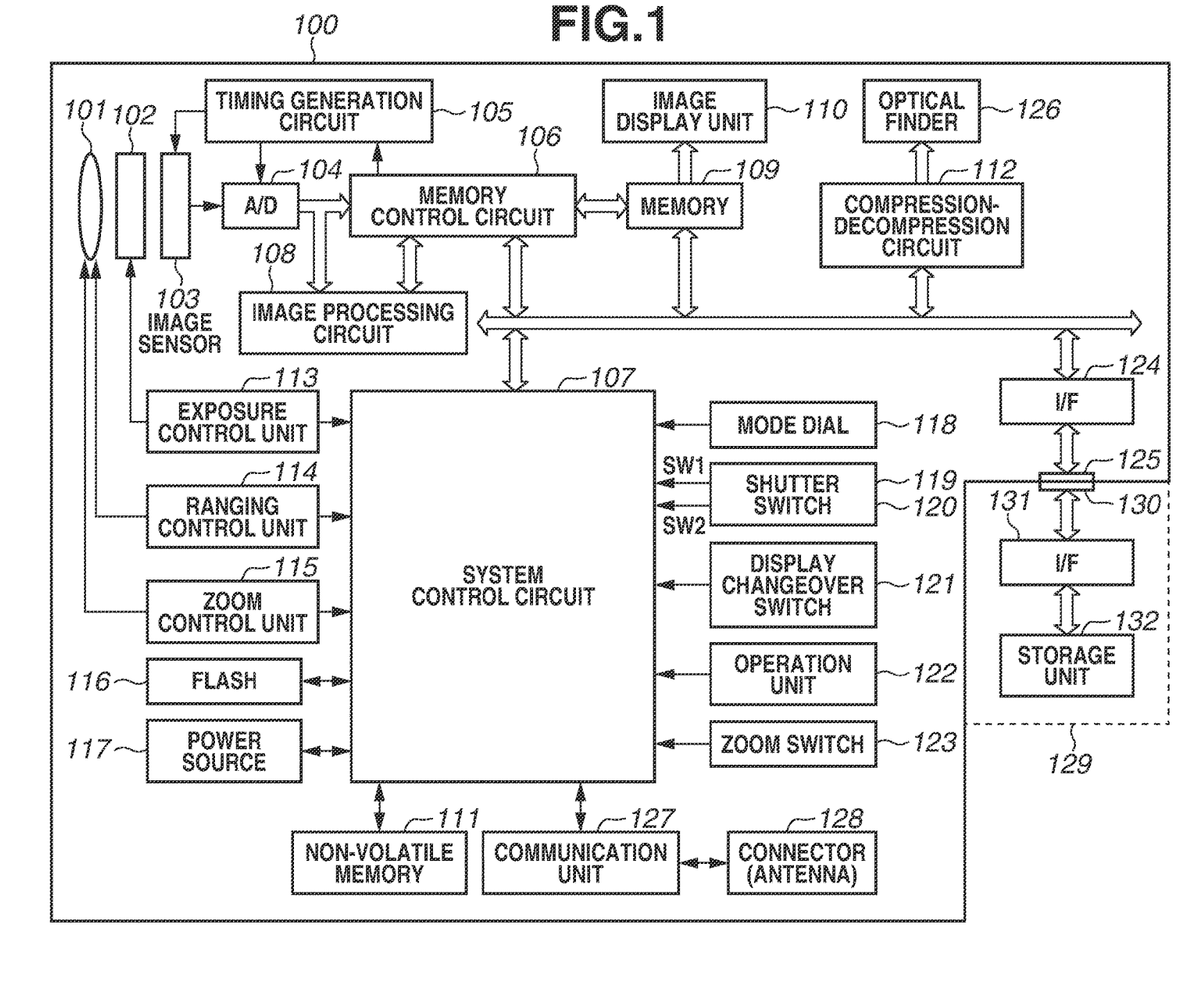
FIG. 1 is a block diagram illustrating a configuration of a digital camera according to a first exemplary embodiment.

FIG. 1 is a block diagram illustrating a configuration of a digital camera 100 according to a first exemplary embodiment.

An imaging lens 101 constitutes an optical system. A shutter 102 is a mechanical shutter having an aperture function. An image sensor 103 converts an optical image into an electric signal. The image sensor 103 is configured to capture a visible light image and an infrared light image. For example, the image sensor 103 is a single plate image sensor having a color filter array, which includes a filter for transmitting only infrared light, so that an image corresponding to non-visible infrared light can be captured. An analog-digital (A/D) conversion unit 104 converts an analog signal output from the image sensor 103 to a digital signal.

A timing generation circuit 105 supplies a clock signal and a control signal to the image sensor 103 and the A/D conversion unit 104. The timing generation circuit 105 is controlled by a memory control circuit 106 and a system control circuit 107. Through the control of a reset timing of the image sensor 103, charge accumulation time can be controlled by the timing generation circuit 105. Therefore, in addition to the shutter 102, the image sensor 103 can be also used as an electronic shutter when a moving image is captured.

The memory control circuit 106 controls the A/D conversion unit 104, the timing generation circuit 105, an image processing circuit 108, a memory 109, and a compression-decompression circuit 112. Data output from the A/D conversion unit 104 is written into the memory 109 via the image processing circuit 108 and the memory control circuit 106, or directly written into the memory 109 via the memory control circuit 106.

The system control circuit 107, which may include one or more processors, one or more memories, circuitry, or a combination thereof, may control the entirety of the digital camera 100.

The image processing circuit 108 executes predetermined pixel interpolation processing or color conversion processing on data transmitted from the A/D conversion unit 104 or the memory control circuit 106. Further, the image processing circuit 108 executes image clipping or scaling processing to realize an electronic zoom function. Further, the image processing circuit 108 executes predetermined arithmetic processing by using captured image data. Based on the acquired arithmetic result, the system control circuit 107 controls an exposure control unit 113 and a ranging control unit 114 to execute autofocus (AF) processing, autoexposure (AE) processing, or pre-flash (EF) processing through a through-the-lens (TTL) method. Further, the image processing circuit 108 executes predetermined arithmetic processing by using captured image data, and executes auto-white balance (AWB) processing through the TTL method based on the acquired arithmetic result.

The memory 109 is a memory for storing still image data or moving image data, and has a memory amount sufficient for storing a certain number of still images and a predetermined period of moving image. Therefore, in a case where continuous imaging or panoramic imaging for consecutively capturing a plurality of still images is to be executed, a large volume of images can be rapidly written into the memory 109. Further, the memory 109 can be used as a work area of the system control circuit 107.

An image display unit 110 is configured with a liquid crystal display (LCD), and displays image data written into the memory 109 via the memory control circuit 106. The image display unit 110 functions as an electronic finder when the captured image data is sequentially displayed. The image display unit 110 can turn on or off the display according to an instruction of the system control circuit 107, and power consumption of the digital camera 100 can be reduced considerably when the display is turned off.

A non-volatile memory 111 is configured with a flash read only memory (ROM). A program code to be executed by the system control circuit 107 is written into the non-volatile memory 111, so that the system control circuit 107 sequentially reads and executes the program code. Further, the non-volatile memory 111 has a region for storing system information or user setting information, so that various types of information or setting can be read and restored at the time of next activation.

The compression-decompression circuit 112 compresses or decompresses the image data through an adaptive discrete cosine transform (ADCT) method. The compression-decompression circuit 112 reads an image stored in the memory 109 to execute compression or decompression processing, and writes the processed data into the memory 109.

The exposure control unit 113 controls the shutter 102 and cooperates with the flash 116 to realize a flash light modulation function. The ranging control unit 114 controls focusing of the imaging lens 101. The zoom control unit 115 controls zooming of the imaging lens 101. The flash 116 has an AF auxiliary light projection function and a flash light modulation function. The exposure control unit 113 and the ranging control unit 114 are controlled through the TTL method, and based on the arithmetic result of captured image data calculated by the image processing circuit 108, the system control circuit 107 executes control with respect to the exposure control unit 113 and the ranging control unit 114.

The power source 117 supplies power to respective units of the digital camera 100. A primary battery such as an alkaline battery or a lithium battery, a secondary battery such as a nickel-cadmium (NiCd) battery, a nickel-metal hydride (NiMH) battery, or a lithium-ion (Li) battery, or an alternating-current (AC) adapter is used for the power source 117.

A mode dial 118, a shutter switch (SW1) 119, a shutter switch (SW2) 120, a display changeover switch 121, an operation unit 122, and a zoom switch 123 are operation units for receiving various operation instructions for the system control circuit 107. These operation units consist of a combination of one or more constituent elements such as a switch, a dial, a touch panel, a pointing device for line-of-sight detection, and a voice recognition device.

An interface 124 serves as an interface between the digital camera 100 and the storage medium 129. A connector 125 connects the digital camera 100 and the storage medium 129. The storage medium 129 may be a memory card or a hard disk. The storage medium 129 includes a storage unit 132 configured with a semiconductor memory or a magnetic disk, an interface 131 with the digital camera 100, and a connector 130 for connecting to the digital camera 100.

Light that enters the imaging lens 101 is checked through an optical finder 126 via a mirror. The user can capture an image by using the optical finder 126 instead of using an electronic finder function provided by the image display unit 110. Further, the optical finder 126 has a function of executing in-focus display, camera-shake warning display, flash charging display, shutter speed display, aperture value display, and exposure correction display.

A communication unit 127 includes at least a part of various communication functions such as a serial port compliant with the Recommended Standard (RS)-232C, a universal serial bus (USB), a serial bus compliant with the Institute of Electrical and Electronics Engineers (IEEE) 1394, a parallel port compliant with P1284, a small computer system interface (SCSI), a modem, a local area network (LAN), and a wireless communication. A connector 128 serves as a device for connecting to another device when the communication unit 127 is in wired communication, and serves as an antenna when the communication unit 127 is in wireless communication.

Figure 2:
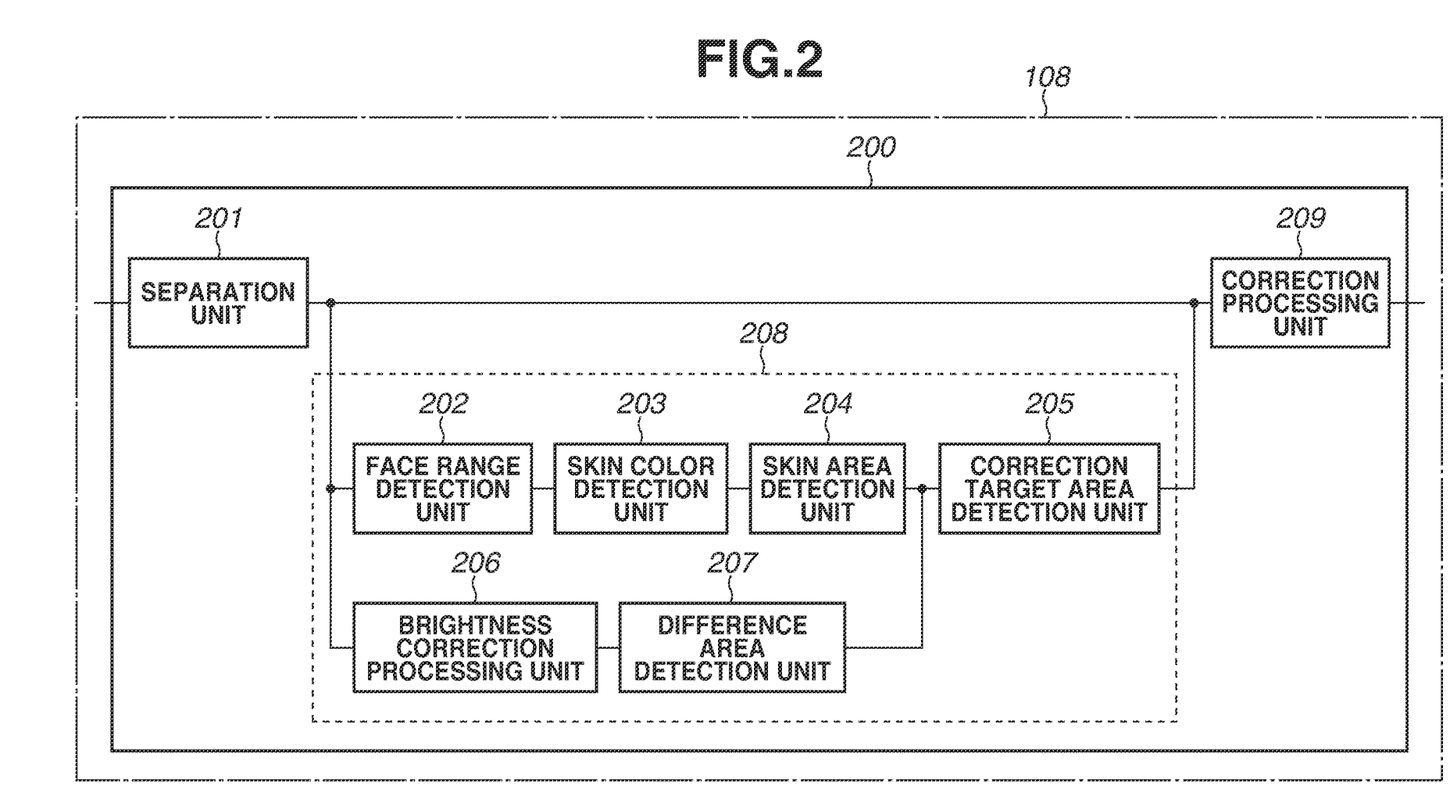
FIG. 2 is a block diagram illustrating a functional configuration of a correction unit of an image processing circuit.

FIG. 2 is a block diagram illustrating a functional configuration of the image processing circuit 108. The image processing circuit 108 includes a correction unit 200 which detects and corrects a correction target area in a captured face range of an object person. Herein, the correction target area refers to an area where a melanin pigment is deposited, which is a cause of a blemish or a freckle on the skin (hereinafter, referred to as "blemish area"). Further, "correction" refers to processing having an effect of making a blemish or a freckle in the blemish area unnoticeable and producing more beautiful skin.

Subsequently, a configuration of the correction unit 200 will be described with reference to FIG. 2.

The correction unit 200 includes a separation unit 201, a detection unit 208, and a correction processing unit 209.

The separation unit 201 uses image data of a captured original image to separate and generate a visible light image and an infrared light image.

The detection unit 208 detects a blemish area in the captured face range of the object person based on the visible light image and the infrared light image generated by the separation unit 201. The detection unit 208 includes a face range detection unit 202, a skin color detection unit 203, a skin area detection unit 204, a brightness correction processing unit 206, a difference area detection unit 207, and a correction target area detection unit 205.

The correction processing unit 209 corrects the blemish area in the visible light image generated by the separation unit 201.

In the present exemplary embodiment, although functions of the separation unit 201, the detection unit 208, and the correction processing unit 209 are realized by the image processing circuit 108, a part of the functions may be realized using another circuit.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Figure 3:
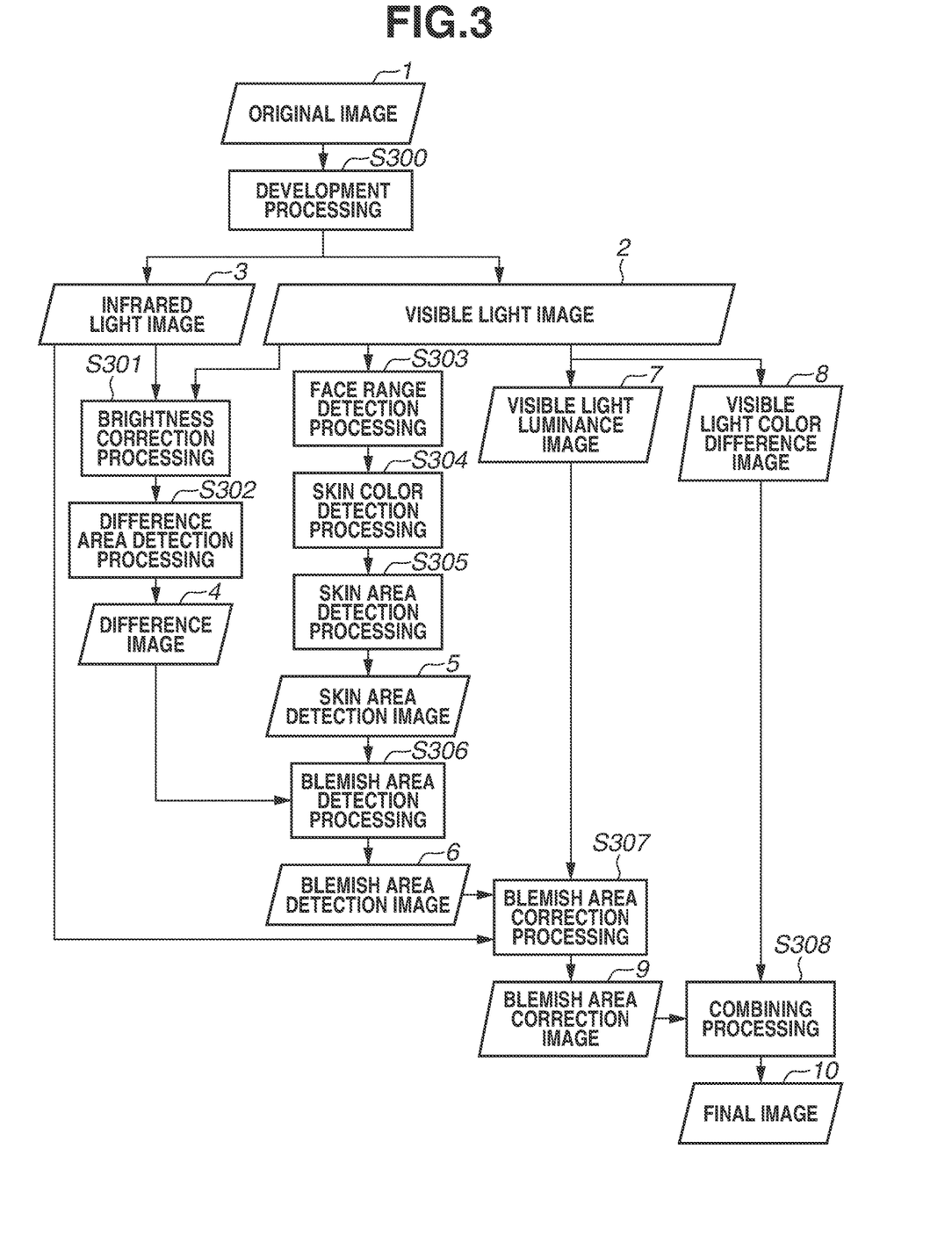
FIG. 3 is a flowchart illustrating image processing according to the first exemplary embodiment.

Hereinafter, image processing in a first exemplary embodiment will be described with reference to the flowchart in FIG. 3. FIG. 3 illustrates image processing executed by the correction unit 200 under the control of the system control circuit 107, and a processor such as a central processing unit (CPU) reads and executes a program stored in a memory to realize the image processing.

Figure 4A:
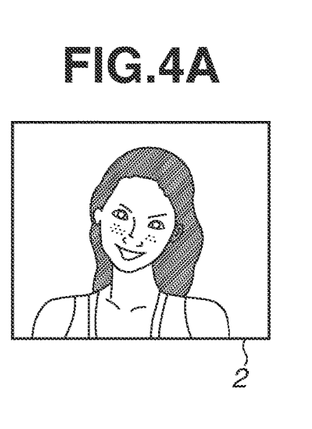
FIGS. 4A to 4E are diagrams schematically illustrating various images.
Figure 4B:
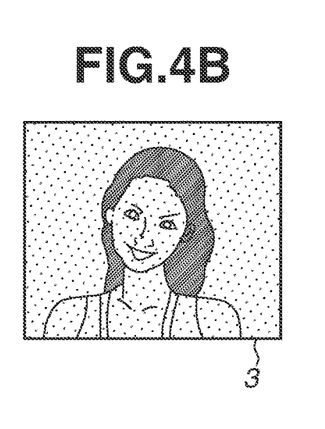

Image data of a captured original image 1 is input to the separation unit 201. Hereinafter, the image data of the original image 1 is simply referred to as "original image 1", and the same is also applicable to the other images. In step S300, the separation unit 201 executes development processing on the original image 1, generates pixel values of visible light and infrared light in the respective pixels, and generates a visible light image 2 and an infrared light image 3. FIGS. 4A and 4B are schematic diagrams respectively illustrating the visible light image 2 and the infrared light image 3. The development processing includes predetermined pixel interpolation processing, white balance processing, RGB (primary colors) to YUV (luminance and color difference) matrix conversion processing, noise reduction processing, and gamma conversion processing. Further, depending on the image sensor to be used, the development processing may include pure color conversion processing for taking out a pure color component in RGB (i.e., primary colors).

In step S303, the face range detection unit 202 of the detection unit 208 executes face range detection processing by using the visible light image 2.

The face range detection unit 202 applies a horizontal bandpass filter to the visible light image 2. Next, the face range detection unit 202 applies a vertical bandpass filter to the visible light image 2 to which the horizontal bandpass filter has been applied. Through the horizontal bandpass filter and the vertical bandpass filter, an edge component is detected from the visible light image 2.

Then, the face range detection unit 202 executes pattern matching with respect to the detected edge component to extract a group of candidates of respective organs such as the eyes, the nose, the mouth, and the ears.

Subsequently, from among the extracted group of candidates of eyes, the face range detection unit 202 determines candidates that satisfy a preset condition (e.g., a distance between the two eyes or orientations thereof) as pairs of eyes, and narrows down the group of candidates of eyes to a group of candidates determined as the pairs of eyes.

Then, the face range detection unit 202 associates each of the narrowed-down candidates of eyes with the other corresponding organs (the nose, the mouth, and the ears) that form a face, and applies a preset non-face condition filter to detect the face range.

A method of the face range detection processing is not limited to the above, and another method may be used. For example, the user may manually select the face range to execute the face range detection processing.

In step S304, the skin color detection unit 203 of the detection unit 208 executes skin color detection processing by using the face range as a processing target.

Based on the image information included in the face range detected in step S303, the skin color detection unit 203 determines brightness and hue of the skin (hereinafter, referred to as "skin color component") of the object person. For example, an average value of the components in the face range, such as hue, saturation, and brightness can be used as the skin color component.

A method of the skin color detection processing is not limited to the above, and the skin color component may be determined by limiting the face range to a range excluding the areas of the organs such as the eyes, the nose, the mouth, and the ears. Further, a histogram of the components of brightness or hue of the skin may be generated, and the skin color component may be determined by extracting the component that exceeds a predetermined threshold value.

In step S305, the skin area detection unit 204 of the detection unit 208 executes skin area detection processing based on the skin color components.

Figure 4C:
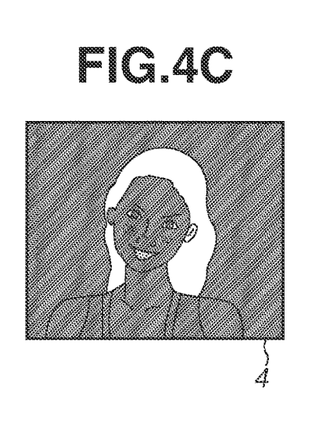
Figure 4D:
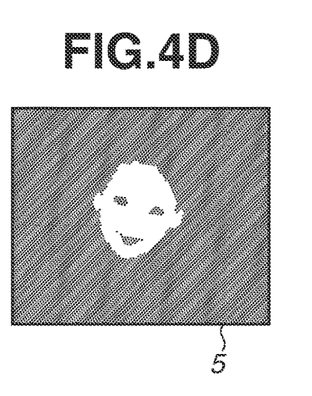

The skin area detection unit 204 detects an area corresponding to the skin in the face range of the object person in the visible light image 2 based on the skin color components detected in step S302, and generates a skin area detection image 5. The skin area detection image 5 is schematically illustrated in FIG. 4D. The skin area detection image 5 is an image to be determined based on how the components of hue, saturation, and brightness of the pixel values in the visible light image 2 and the skin color components are close to each other. In the present exemplary embodiment, the skin area detection image 5 is an image in which the pixel closest to the skin color component takes the greatest pixel value. In addition, in order to improve a detection precision of the below-described blemish area detection processing in step S306, the skin area detection image 5 may be generated by restricting a relevant range to the face range excluding the areas of the organs such as the eyes, the nose, the mouth, and the ears.

On the other hand, in step S301, the brightness correction processing unit 206 of the detection unit 208 executes brightness correction processing for correcting the brightness of at least either one of the visible light image 2 and the infrared light image 3.

The brightness correction processing unit 206 executes gain adjustment to equalize the brightness (luminance values) of the visible light image 2 and the infrared light image 3. As a method of adjusting the gain, the brightness correction processing unit 206 executes gain adjustment with respect to the pixels corresponding to the skin area in the skin area detection image 5, so that an average pixel value of the luminance component in the visible light image 2 becomes equal to an average pixel value of the infrared light image 3.

In step S302, the difference area detection unit 207 of the detection unit 208 executes difference area detection processing for detecting a difference area between the visible light image 2 and the infrared light image 3.

The difference area detection unit 207 calculates a difference between respective pixel values of the visible light image 2 and the infrared light image 3 which have been subjected to the brightness correction in step S301, and generates a difference image 4. Herein, the difference image 4 is an image in which pixels having differences greater than a predetermined threshold value are detected as a difference area. The difference image 4 is schematically illustrated in FIG. 4C.

Figure 5:
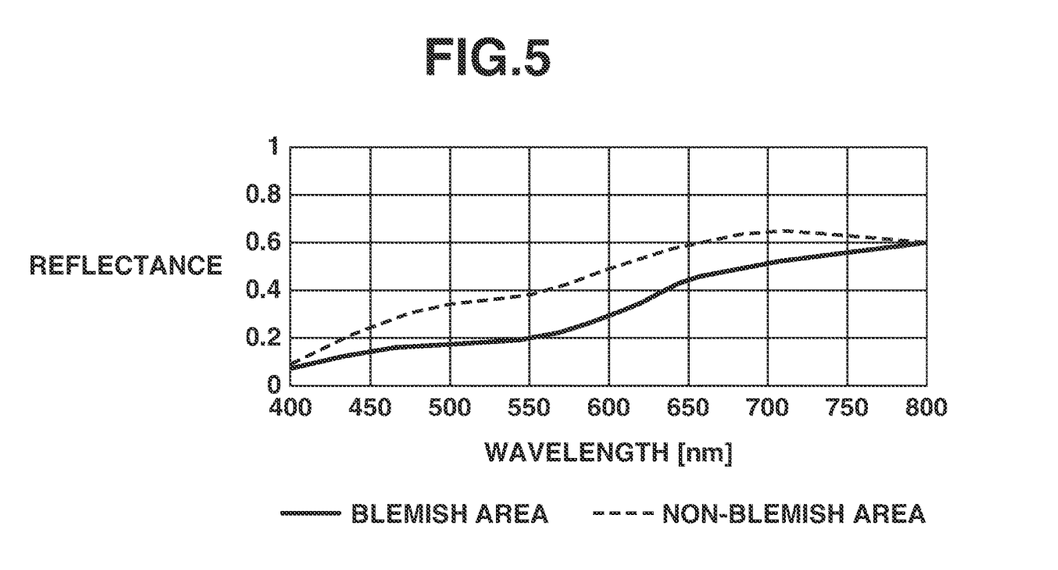
FIG. 5 is a characteristic diagram illustrating an example of spectral reflectance of a blemish area and a non-blemish area.

Herein, infrared light is characterized in that a blemish or a freckle is less likely to be captured in the image because absorption thereof is low in the skin area having the deposited melanin pigment. On the other hand, visible light is characterized in that a blemish or a freckle is likely to be captured in the image because absorption thereof is high in the skin area having the deposited melanin pigment. FIG. 5 is a graph illustrating an example of spectral reflectance in a blemish area and a non-blemish area. In an infrared light region having the wavelength of approximately 800 nm, there is only a small difference between the spectral reflectance of the blemish area and the non-blemish area, so that the blemish is less likely to be captured in the image. On the other hand, in a visible light region having the wavelength of 400 to 800 nm, there is a greater difference between the spectral reflectance of the blemish area and the non-blemish area, so that the blemish is likely to be captured in the image.

Because of the above-described reasons, a blemish area can be detected if the brightness of the visible light image 2 and the brightness of the infrared light image 3 is equalized by the brightness correction processing unit 206, and a difference between the visible light image 2 and the infrared light image 3 is acquired by the difference area detection unit 207.

Therefore, in step S306, the correction target area detection unit 205 of the detection unit 208 uses the difference image 4 and the skin area detection image 5 to execute processing for detecting a blemish area as a correction target area.

Figure 4E:
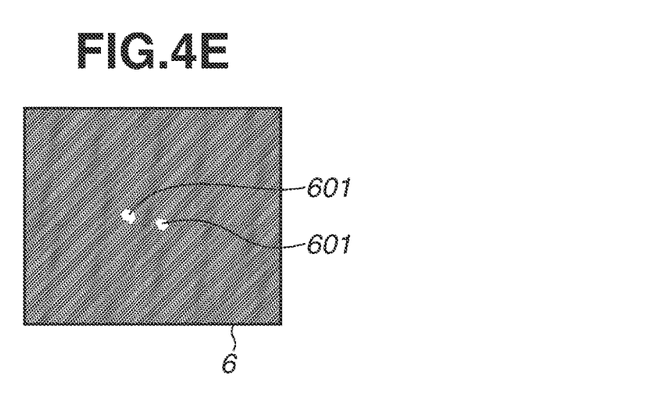

The correction target area detection unit 205 detects an overlapping region of a difference area in the difference image 4 and a skin area in the skin area detection image 5, and generates a blemish area detection image 6 to make the pixels corresponding to the overlapping region recognizable. The blemish area detection image 6 where a blemish area 601 is detected is schematically illustrated in FIG. 4E. In addition, because a portion other than the blemish portion may be detected as the overlapping region because of an influence of shadows of the organs (i.e., the eyes, the nose, and the mouth) which form the face, a size of the area may be restricted when the blemish area is to be detected. In other words, when the overlapping region is detected, an overlapping region having a size equal to or greater than a threshold value is eliminated from the blemish area. The processing of eliminating the portion other than the blemish portion may be executed through the difference area detection processing in step S302.

In step S307, the correction processing unit 209 executes blemish area correction processing for correcting the blemish area in the visible light image 2.

With respect to the blemish area 601 detected in step S306, the correction processing unit 209 uses the infrared light image 3 to correct the pixel value of the luminance component of the visible light image 2 (hereinafter, referred to as "visible light luminance image 7") and generates a new luminance component (hereinafter, referred to as "blemish area correction image 9"). For example, the correction processing unit 209 replaces the pixel value of the visible light luminance image 7 with the pixel value of the infrared light image 3 to acquire a high-luminance image in the blemish area 601. As described above, the correction processing unit 209 reconstitutes the visible light luminance image 7 to generate the blemish area correction image 9.

In step S308, the correction processing unit 209 combines the blemish area correction image 9 and the color difference component (hereinafter, referred to as "visible light color difference image 8") of the visible light image 2 to generate a final image 10 in which an effect of producing the beautiful skin is enhanced.

As described above, because the blemish area in the captured face range of the object person is detected and corrected, a size of the correction area is reduced, and a correction image without having deterioration in color or quality of the skin in the face range of the object person can be acquired.

Further, in the present exemplary embodiment, while correction is executed by specifying a face range of an object person as a target, the present disclosure is applicable to any portion of a skin area of the object person.

Hereinafter, a second exemplary embodiment will be described. In the first exemplary embodiment, although the infrared light image 3 is used for the blemish area correction processing in step S307, only the visible light image 2 may be used for the correction processing. In the present exemplary embodiment, a variation example of the blemish area correction processing will be described. A configuration and basic operation or processing of the digital camera 100 are similar to those described in the first exemplary embodiment. Therefore, a portion different from the first exemplary embodiment will be mainly described, and description of a portion common to the first exemplary embodiment will be omitted.

Figure 6:
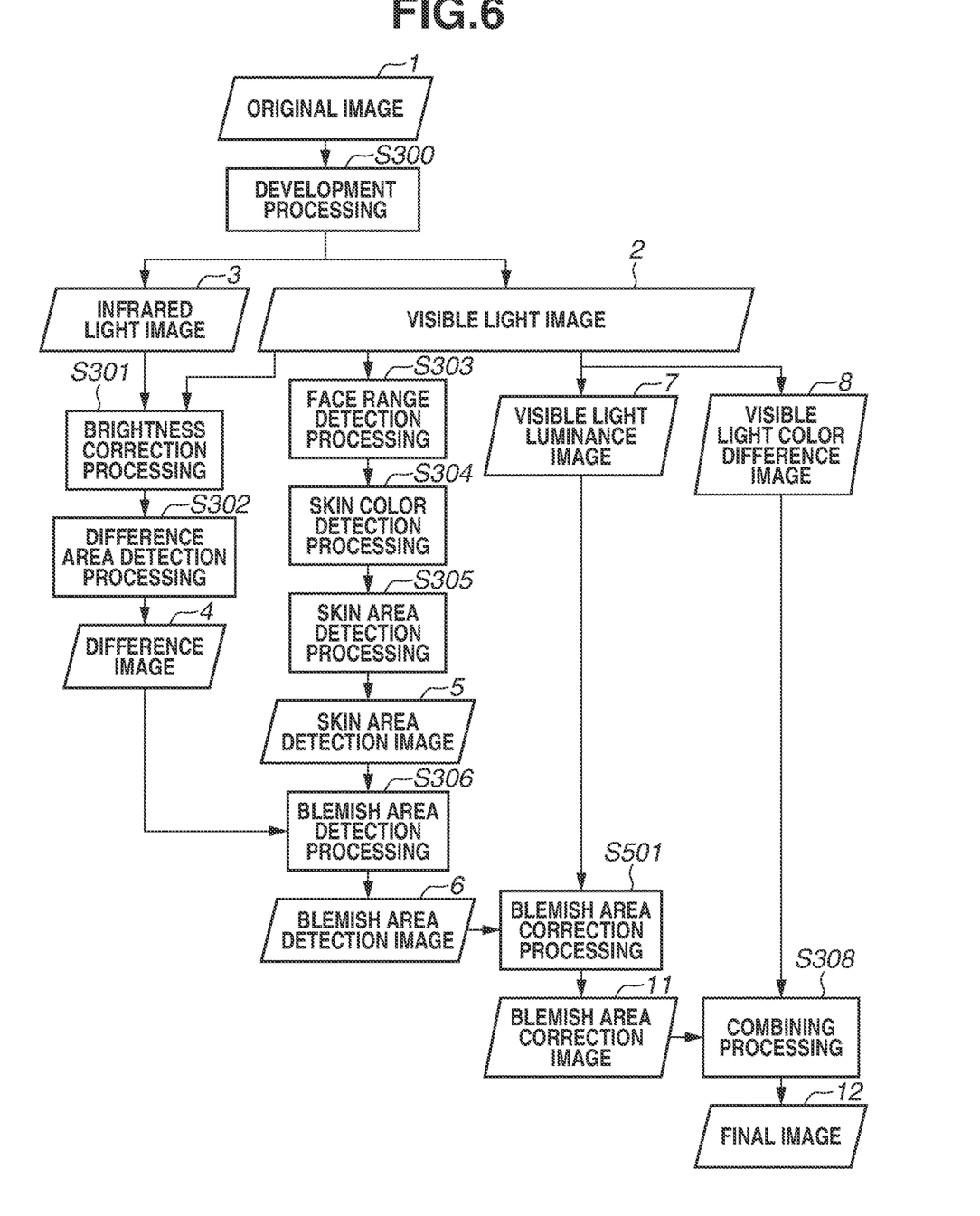
FIG. 6 is a flowchart illustrating image processing according to a second exemplary embodiment.

Hereinafter, image processing of the present exemplary embodiment will be described with reference to the flowchart in FIG. 6. The present exemplary embodiment is different from the first exemplary embodiment in an idea of the blemish area correction processing executed by the correction processing unit 209 in step S501.

In step S501, the correction processing unit 209 executes blemish area correction processing for correcting the blemish area in the visible light image 2.

With respect to the blemish area 601 detected in step S306, the correction processing unit 209 corrects the pixel value of the visible light luminance image 7 by using the luminance component of the peripheral pixel in the blemish area 601 and generates a new luminance component (hereinafter, referred to as "blemish area correction image 11"). For example, the correction processing unit 209 specifies pixels existing within a certain distance from the blemish area 601 as peripheral pixels. Then, from among the peripheral pixels, the correction processing unit 209 calculates an average luminance value of the pixels of which the luminance difference from a luminance of the pixel at the center of the blemish area 601 is less than a predetermined threshold value. The luminance value of the pixel in the blemish area 601 is corrected by using the average luminance value. Through the above processing, the correction processing unit 209 reconstitutes the visible light luminance image 7 to generate the blemish area correction image 11.

In step S308, the correction processing unit 209 combines the blemish area correction image 11 and the visible light color difference image 8 to generate a final image 12 in which an effect of producing the beautiful skin is enhanced.

In the present exemplary embodiment, only the visible light image 2 is used for the blemish area correction processing. Therefore, for example, even if the infrared light image 3 is in an insufficient in-focus state, the correction image without having deterioration in color or quality of the skin can be acquired.

Hereinafter, a third exemplary embodiment will be described. While use of a flash 116 has not been described in the first or the second exemplary embodiment, an image can also be captured by using the flash 116. In the present exemplary embodiment, the original image 1 is acquired through the image capturing by irradiation with light emitted from the flash 116. A configuration and basic operation or processing of the digital camera 100 are similar to those described in the first exemplary embodiment. Therefore, hereinafter, a portion different from the first or the second exemplary embodiment will be mainly described, and description of a portion common to the first or the second exemplary embodiment will be omitted.

In order to acquire an infrared light image even under the condition where infrared light is not present, an infrared light source having a wavelength of 700 nm to 1000 nm, which belongs to any one of the ranges of near-infrared light, mid-infrared light, and far-infrared light, is used as a flash light source.

The original image 1 captured when irradiated with light from the flash 116 is input to the separation unit 201. In step S300, the separation unit 201 executes development processing including color interpolation processing on the original image 1, generates pixel values of visible light and infrared light in respective pixels, and generates the visible light image 2 and the infrared light image 3.

In the present exemplary embodiment, even under the condition such as an indoor space where infrared light is not present, a correction image without having deterioration in color or quality of the skin can be acquired.

Hereinafter, a fourth exemplary embodiment will be described. In the present exemplary embodiment, two types of original images are acquired by consecutively executing imaging through irradiation with infrared light and imaging without irradiation with infrared light emitted from the flash 116, and a skin area is detected by using the spectral reflectance of the object. A configuration and basic operation or processing of the digital camera 100 are similar to those described in the first exemplary embodiment. Therefore, hereinafter, a portion different from the first, the second, or the third exemplary embodiment will be mainly described, and description of a portion common to the first, the second, or the third exemplary embodiment will be omitted.

Figure 7:
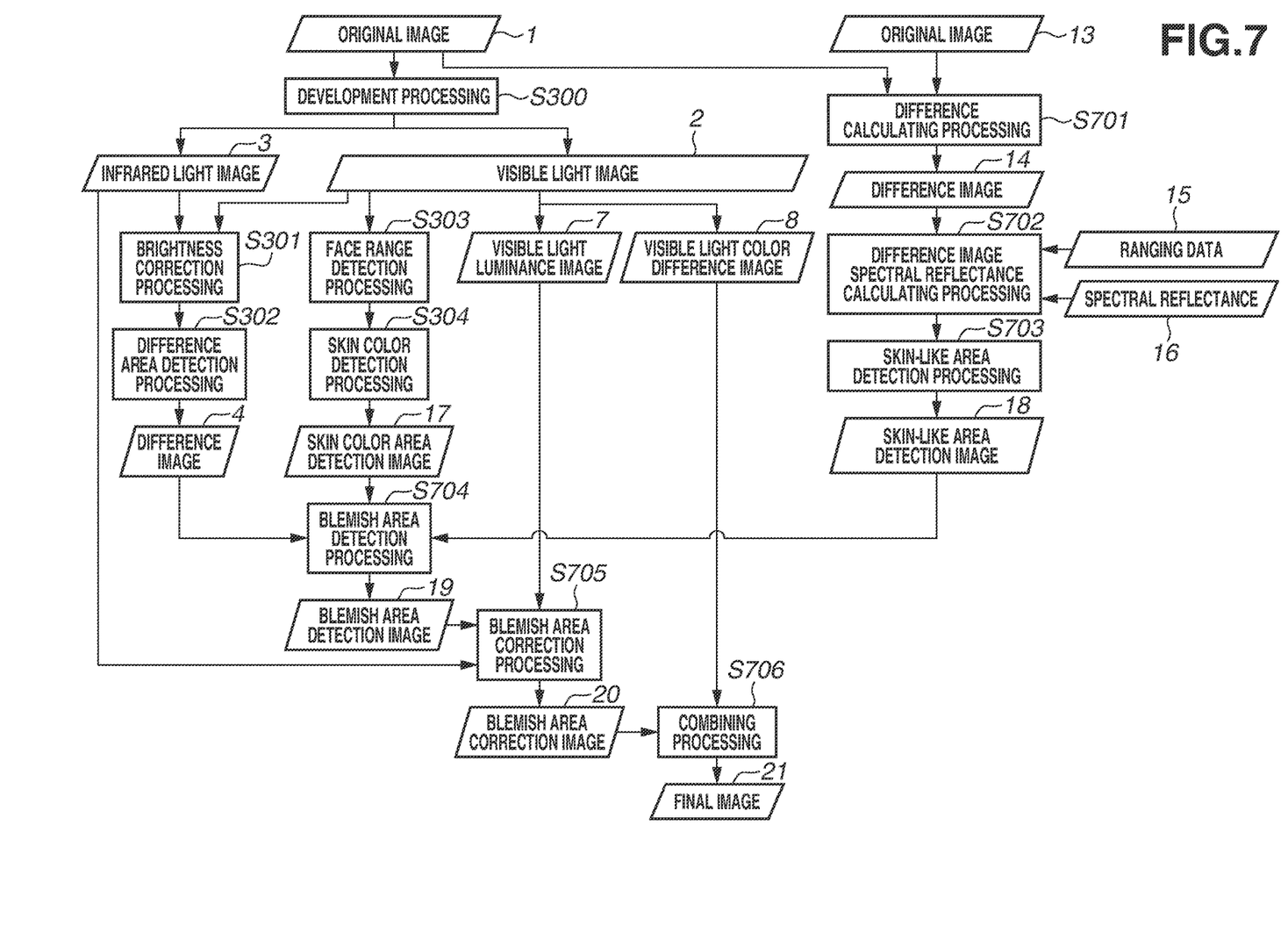
FIG. 7 is a flowchart illustrating image processing according to a fourth exemplary embodiment.

Hereinafter, image processing according to the present exemplary embodiment will be described with reference to the flowchart in FIG. 7. First, the original image 1 is acquired through imaging with irradiation with infrared light from the flash 116. An infrared light source is used as the flash light source, and configurations for generating a visible light image 2 and an infrared light image 3, a difference image 4 from the infrared light image 3, and a visible light luminance image 7 and a visible light color difference image 8 from the visible light image 2 are similar to those described in the first, the second, and the third exemplary embodiments.

Next, an original image 13 is acquired through imaging without irradiation with infrared light from the flash 116. Herein, the present exemplary embodiment is different from the first to the third exemplary embodiments in that the spectral reflectance of the object is used for detecting the skin area.

In step S701, the image processing circuit 108 calculates difference between the luminance values of the original images 1 and 13 and acquires a difference image 14.

In step S702, the image processing circuit 108 calculates the spectral reflectance of the object in the difference image 14 from the ranging data 15 and the spectral reflectance 16 acquired from the ranging control unit 114.

In step S703, the image processing circuit 108 executes processing for detecting a skin-like area and generates a skin-like area detection image 18. Specifically, on the premise that the skin of the object person is in focus, data that can be acquired from the ranging control unit 114 is a distance between the digital camera 100 and the object person. Further, a relationship between a distance from the digital camera 100 to an object, and spectral reflectance in the wavelength of the flash 116 is previously stored in the non-volatile memory 111 inside the digital camera 100 as a database. The above-described relationship between a distance and a spectral reflectance can be restated as a relationship between a distance and a variation of the luminance value with or without a flash light source. A spectral reflectance at an in-focus position can be acquired from the difference image 14 of the luminance value by using the above data. The spectral reflectance of the human skin has been known. For example, the spectral reflectance of the human skin at the wavelength of 880 nm is 60 to 70%.

In step S704, the correction target area detection unit 205 of the detection unit 208 executes blemish area detection processing by using the skin color area detection image 17 generated through the skin color detection processing in step S304, the difference image 4, and the skin-like area detection image 18, and generates a blemish area detection image 19. Then, similar to the first, the second, or the third exemplary embodiment, a blemish area correction image 20 is generated in step S705, and a final image 21 is generated through the processing in step S706.

Further, while the infrared light image 3 is used for the blemish area correction processing in step S705 of the flowchart in the present exemplary embodiment similar to the first exemplary embodiment, the present exemplary embodiment is not limited thereto. Furthermore, consecutive imaging has been executed in which after imaging with irradiation of light, imaging without irradiation of light from the flash 116 is executed. However, the imaging order is not limited thereto. Imaging may be consecutively executed with irradiation of light after imaging is executed without irradiation of light.

While the exemplary embodiments of the present disclosure have been described as the above, the above-described exemplary embodiments are merely the examples embodying the present disclosure, and shall not be construed as limiting the technical range of the present disclosure. In other words, the present disclosure can be realized in diverse ways without departing from the technical spirit or main features of the present disclosure.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image processing apparatus which executes image processing by using a visible light image and an infrared light image, the apparatus comprising:
    at least one processor or circuit configured to function as:
    a skin area detection unit configured to detect a skin area of an object person;
    a difference area detection unit configured to detect a difference area between the visible light image and the infrared light image;
    a correction target area detection unit configured to detect a correction target area of the object person based on the skin area detected by the skin area detection unit and the difference area detected by the difference area detection unit; and
    a correction unit configured to correct the correction target area in the visible light image.

2. The image processing apparatus according to claim 1, wherein the correction unit corrects a luminance component of the visible light image in the correction target area by using the infrared light image to generate a new luminance component, and combines the new luminance component with a color difference component of the visible light image.

3. The image processing apparatus according to claim 1, wherein the correction unit corrects a luminance component of the visible light image in the correction target area by using a luminance component of a peripheral pixel in the correction target area to generate a new luminance component, and combines the new luminance component with a color difference component of the visible light image.

4. The image processing apparatus according to claim 1, wherein the at least one processor or circuit is further is configured to function as a brightness correction unit configured to correct brightness of at least either one of the visible light image and the infrared light image,
    wherein the difference area detection unit detects a difference area between the visible light image and the infrared light image, the brightness of which has been corrected by the brightness correction unit.

5. The image processing apparatus according to claim 1, wherein the visible light image and the infrared light image are acquired by a same image sensor.

6. The image processing apparatus according to claim 1, wherein the visible light image and the infrared light image are acquired through imaging with irradiation of infrared light.

7. The image processing apparatus according to claim 1, wherein the skin area detection unit detects only the skin area in a range excluding an organ area in a face range of the object person.

8. The image processing apparatus according to claim 1, wherein the correction target area detection unit restricts a size of a detection area when the correction target area is detected.

9. The image processing apparatus according to claim 1, wherein the skin area detection unit uses the visible light image to detect a skin area of the object person.

10. The image processing apparatus according to claim 1, wherein the skin area detection unit calculates a difference between an image acquired by an imaging apparatus through imaging with irradiation of infrared light and an image acquired by imaging without irradiation of infrared light, and detects the skin area from the difference of the images based on a relationship between a distance from the object person to the imaging apparatus, and spectral reflectance in a wavelength of infrared light.

11. The image processing apparatus according to claim 4, wherein the brightness correction unit equalizes the brightness between the visible light image and the infrared light image.

12. An imaging apparatus comprising:
    an imaging unit configured to capture a visible light image and an infrared light image; and
    an image processing apparatus which executes image processing by using a visible light image and an infrared light image, the image processing apparatus comprising:
    at least one processor or circuit configured to function as:
    a skin area detection unit configured to detect a skin area of an object person;
    a difference area detection unit configured to detect a difference area between the visible light image and the infrared light image;
    a correction target area detection unit configured to detect a correction target area of the object person based on the skin area detected by the skin area detection unit and the difference area detected by the difference area detection unit; and
    a correction unit configured to correct the correction target area in the visible light image.

13. An image processing method for executing image processing by using a visible light image and an infrared light image, the method comprising:
    detecting a skin area of an object person;
    detecting a difference area between the visible light image and the infrared light image;
    detecting a correction target area of the object person based on the detected skin area and the detected difference area; and
    correcting the correction target area in the visible light image.

14. A non-transitory computer-readable storage medium storing a program for causing a computer to execute following operations of image processing using a visible light image and an infrared light image, the operations comprising:
- detecting a skin area of an object person;
- detecting a difference area between the visible light image and the infrared light image;
- detecting a correction target area of the object person based on the detected skin area and the detected difference area; and
- correcting the correction target area in the visible light image.

* * * * *